(12) United States Patent
Anderson

(10) Patent No.: US 8,108,557 B2
(45) Date of Patent: Jan. 31, 2012

(54) SYSTEM AND METHOD FOR MEASURING CLOCK SKEW ON A NETWORK

(75) Inventor: Eric A. Anderson, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 195 days.

(21) Appl. No.: 12/357,636

(22) Filed: Jan. 22, 2009

(65) Prior Publication Data

US 2010/0185781 A1    Jul. 22, 2010

(51) Int. Cl.
*G06F 15/16* (2006.01)
(52) U.S. Cl. .................................................. 709/248
(58) Field of Classification Search ............ 709/203, 709/221, 223, 224, 248, 249; 713/401, 503
See application file for complete search history.

(56) References Cited

U.S. PATENT DOCUMENTS

| | | | |
|---|---|---|---|
| 5,475,690 A * | 12/1995 | Burns et al. ................. 370/519 |
| 6,002,282 A * | 12/1999 | Alfke .............................. 327/165 |
| 6,405,312 B1 * | 6/2002 | Ly ................................... 713/155 |
| 6,691,254 B2 | 2/2004 | Kaler et al. |
| 6,785,873 B1 * | 8/2004 | Tseng ............................. 716/102 |
| 6,847,652 B1 * | 1/2005 | Fourcand et al. ............. 370/438 |
| 7,024,692 B1 * | 4/2006 | Schanze et al. ............... 726/10 |
| 7,088,398 B1 * | 8/2006 | Wolf et al. ................ 348/423.1 |
| 7,177,306 B2 * | 2/2007 | Dowdal et al. ................ 370/356 |
| 7,185,216 B1 * | 2/2007 | Bhandari et al. .............. 713/400 |
| 7,191,418 B2 * | 3/2007 | Lee et al. ............................ 716/6 |
| 7,194,556 B2 * | 3/2007 | Rajagopal et al. ............ 709/248 |
| 7,194,649 B2 * | 3/2007 | Liu et al. ......................... 713/400 |
| 7,284,143 B2 * | 10/2007 | Song et al. ..................... 713/503 |
| 7,333,517 B2 * | 2/2008 | Madhavapeddi et al. ..... 370/509 |
| 7,334,014 B2 * | 2/2008 | Moser et al. .................. 709/202 |
| 7,356,618 B2 * | 4/2008 | Lienhart et al. ............... 709/248 |
| 7,398,413 B2 * | 7/2008 | Hampel et al. ................ 713/503 |
| 7,401,246 B2 * | 7/2008 | Martin et al. .................. 713/500 |
| 7,440,531 B2 * | 10/2008 | Dreps et al. .................... 375/371 |
| 7,475,272 B2 | 1/2009 | Carlson et al. |
| 7,479,819 B2 | 1/2009 | Bueti et al. |
| 7,526,666 B1 * | 4/2009 | Soni ............................... 713/500 |

(Continued)

OTHER PUBLICATIONS

Mills, Network Time Protocol Version 4 Reference and Implementation Guide, NTP Working Group, Technical Report 06-6-1, 2006, pp. 1-85.

(Continued)

*Primary Examiner* — Andrew Caldwell
*Assistant Examiner* — Melvin H Pollack

(57) ABSTRACT

A system and method for measuring clock skew in a network is disclosed. The method comprises sending an echo message at a periodic rate from a plurality of servers in the network to an anchor server. A reply message can be sent from the anchor server to each server that includes a remote timestamp based on the anchor server clock. The remote timestamp can be recorded at each of the servers. A send timestamp that designates a time the echo message was sent and a receive timestamp that designates a time the reply message was received at the server can then be recorded. An estimated clock time of each server may also be calculated relative to the anchor server using the send and receive timestamps. A clock skew value can be determined by subtracting the estimated clock time of each server from the remote timestamp time. Interpolation can then performed between the clock skew values over a selected portion of the period of time to enable clock skew values to be estimated over the selected portion of time.

18 Claims, 7 Drawing Sheets

U.S. PATENT DOCUMENTS

| | | | |
|---|---|---|---|
| 7,590,807 B2 * | 9/2009 | McGovern et al. | 711/159 |
| 7,590,879 B1 * | 9/2009 | Kim et al. | 713/401 |
| 7,626,442 B2 * | 12/2009 | Zerbe et al. | 327/336 |
| 7,647,521 B2 * | 1/2010 | Levine et al. | 713/503 |
| 7,661,010 B2 * | 2/2010 | DeFazio et al. | 713/500 |
| 7,702,941 B2 * | 4/2010 | Lienhart et al. | 713/400 |
| 7,747,888 B2 * | 6/2010 | Frodsham et al. | 713/400 |
| 7,797,685 B2 * | 9/2010 | Agarwala et al. | 717/128 |
| 7,831,779 B2 * | 11/2010 | Holt | 711/147 |
| 7,895,303 B2 * | 2/2011 | Carlson et al. | 709/222 |
| 7,898,968 B2 * | 3/2011 | von Eicken et al. | 370/248 |
| 2002/0181633 A1 * | 12/2002 | Trans | 375/354 |
| 2005/0044080 A1 * | 2/2005 | Fridella et al. | 707/10 |
| 2005/0210153 A1 * | 9/2005 | Rich et al. | 709/248 |
| 2007/0050562 A1 | 3/2007 | Alsup | |
| 2007/0220252 A1 * | 9/2007 | Sinko | 713/168 |
| 2007/0234409 A1 * | 10/2007 | Eisen | 726/6 |
| 2008/0126503 A1 * | 5/2008 | Holt | 709/212 |
| 2008/0170592 A1 * | 7/2008 | Hack et al. | 370/503 |
| 2008/0183896 A1 * | 7/2008 | Carlson et al. | 709/248 |
| 2008/0244094 A1 * | 10/2008 | Rich et al. | 709/248 |
| 2009/0109988 A1 * | 4/2009 | Musunuri et al. | 370/412 |
| 2009/0222685 A1 * | 9/2009 | Foster et al. | 713/500 |
| 2009/0276653 A1 * | 11/2009 | Pattabhiraman et al. | 713/502 |
| 2010/0037081 A1 * | 2/2010 | Froehlich et al. | 713/502 |
| 2010/0135332 A1 * | 6/2010 | Siemens et al. | 370/503 |

OTHER PUBLICATIONS

Mills, Adaptive Hybrid Clock Discipline Algorithm for the Network Time Protocol, IEEE/ACM Trans. Networking 6, 5, Oct. 1998, pp. 1-12.

Mills, Network Time Protocol (Version 3), RFC-1305, Mar. 1992, pp. 1-50.

Mills, Internet Time Synchronization: the Network Time Protocol, IEEE Trans. Communications 39, 10, Oct. 1991, pp. 1-14.

Fonseca et al., X-Trace: A Pervasive Network Tracing Framework, NSDI 4th USENIX Symposium on Networked Systems Design & Implementation, 2007, pp. 271-284.

Liu et al., D3S: Debugging Deployed Distribution Systems, Proc. 5th Symposium on Networked Systems Design & Implementation, 2008, pp. 423-437.

Reynolds et al., Pip: Detecting the Unexpected in Distributed Systems, Proc. 3rd Symposium on Networked Systems Design & Implementation, 2006, pp. 115-128.

* cited by examiner

SYSTEM AND METHOD FOR MEASURING CLOCK SKEW ON A NETWORK

BACKGROUND

Distributed computing systems have substantially increased our ability to solve complex problems. Today's fastest supercomputers typically use thousands, or even tens of thousands of processors. These processors may all be located in a single room or area. Alternatively, relatively inexpensive super computers have been formed using distributed desktop computers located across the world, and connected only by the network. Programs created to run on the distributed systems take into account the amount of time it takes for communication between the devices. Performance optimization and debugging can be used to significantly improve the system's speed.

Debugging software programs that are designed to operate in a distributed computing system have enormous difficulties. Identifying problems that reduce performance of the software in the distributed system can be daunting due to the many processors and paths that can operate nearly simultaneously in real time. The number of possible causes of potential bugs can be relatively large.

Precise and accurate timestamps can be valuable to performance debugging. Accurate timestamps enable inter-node timing to be determined. For example, measuring inter-node message delay between computing devices, such as servers or central processing units, to determine if a program is experiencing queuing delay is only possible if the timestamps on both the sending device and receiving device are relatively precise, accurate, and synchronized. The use of local timestamps is typically inadequate. Even when the distributed computing environment is using running Network Time Protocol (NTP), the computing devices can have clock skews of on the order of one to two milliseconds, while the latency on an Ethernet Local Area Network (LAN) may be only fifty microseconds, for example.

Moreover, clock skews can change over time in a highly irregular and unpredictable manner. The inability to know how clock skews change between the computing devices in a distributed computing system reduces the overall ability to optimize the performance of software on the distributed computing system.

BRIEF DESCRIPTION OF THE DRAWINGS

Features and advantages of the disclosure will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION

On a network such as a LAN or the internet, clock skew describes the difference in time shown by the clocks at the different computing device nodes on the network. Each clock can represent a different time. Clock skew is usually an unavoidable phenomenon that becomes more apparent at fine grained time scales. On the internet, clock skew of tens of minutes or more is quite common. Even in carefully controlled distributed computing environments, significant clock skew can be present at millisecond time resolutions. This can be true even when using timing protocols, such as the Network Time Protocol (NTP). At the fine grained time scales, clock skew can be caused by temporal drift that naturally occurs in relatively inexpensive clocks typically used in computers and servers. This drift can cause the amount of clock skew between any two computing devices to change over time. The inability to know how clock skews change between the computing devices in a distributed computing system reduces the overall ability to optimize the performance of software on the distributed computing system.

Consider the straightforward attempt to figure out transmission time by time stamping the sending time and the receiving time of a message by using a sender's local clock and the receiver's local clock, respectively. In this example, the sender and receiver may each be a typical desktop computer, a server, a portable computing device, or the like. Due to clock skews, the difference between these two timestamps is not an accurate estimate of the transmission time between the devices.

To overcome this difficulty, the two timestamps can be translated into a single time frame. In accordance with one embodiment of the present disclosure, the single time frame can be accomplished using a designated time server. The designated time server is referred to as an anchor server. The anchor server may be located on a server in a distributed networking system that is also used to accomplish other tasks in the system. Alternatively, the anchor server may not be used for any other tasks in order to provide a rapid response.

To ensure accurate translation, two issues are addressed: (1) how to measure the clock skew between an arbitrary computing device and the anchor time server; and (2) how to compute the clock skew.

Figure 1:
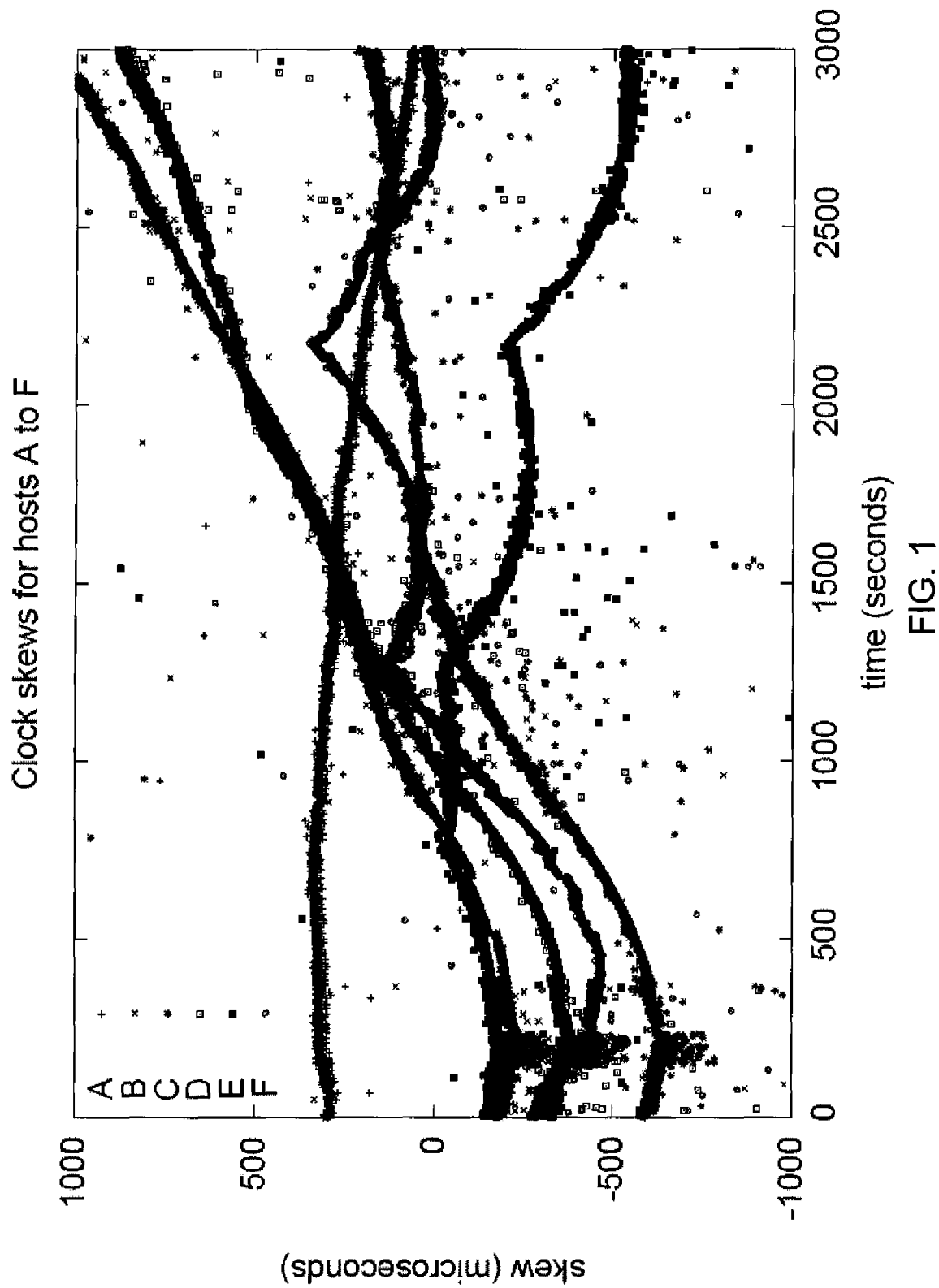
FIG. 1 is an illustration of clock skew between servers A-F on a network and an anchor server in accordance with an embodiment of the present disclosure.

FIG. 1 provides an illustration of clock skew, as measured between six computing devices, designated hosts A through F respectively, and an anchor server. In this example, hosts A through F are servers located in a server cluster. However, the devices can be any type of computing device located on a distributed network.

As the clock skews between the anchor server and the other devices is non-constant, the translation from a device's local time to its corresponding anchor time can be accomplished using frequent monitoring of the clock skew between the two.

Figure 2:
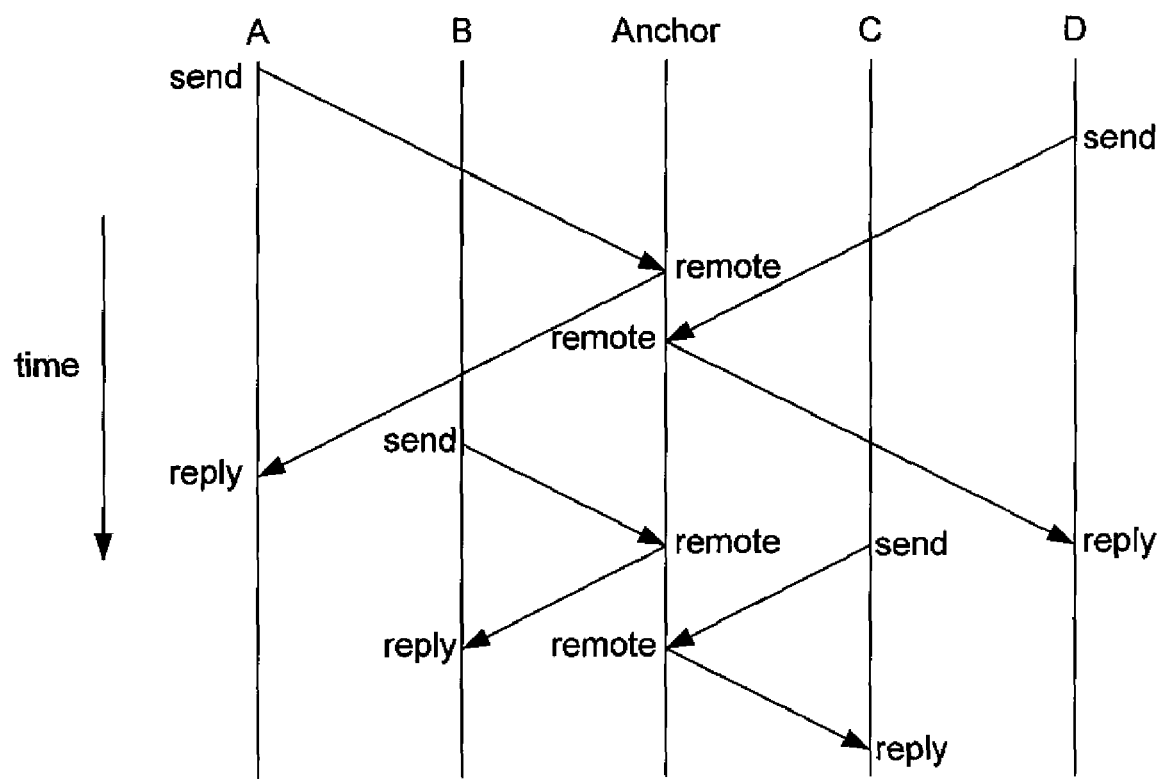
FIG. 2 is an illustration of an echo message sent between servers A-D on a network and an anchor server in accordance with an embodiment of the present disclosure.

In accordance with one embodiment of the present disclosure illustrated in FIG. 2, a plurality of host servers can send an echo message to the anchor time server. The anchor server can immediately send back a reply message that includes a remote timestamp designating the receiving time of the echo message at the anchor server, based on the anchor server clock. Upon receiving the reply, each of the plurality of host servers can record the send timestamp value designating the time at each respective server when the echo message was sent. This can be based on the server's respective clock, the remote timestamp value, and the reply timestamp value designating the time at which the echo message was received from the anchor server, based on each server's respective clock. This information may be recorded in each server's trace file. The trace record is referred to as a time measurement.

Figure 3:
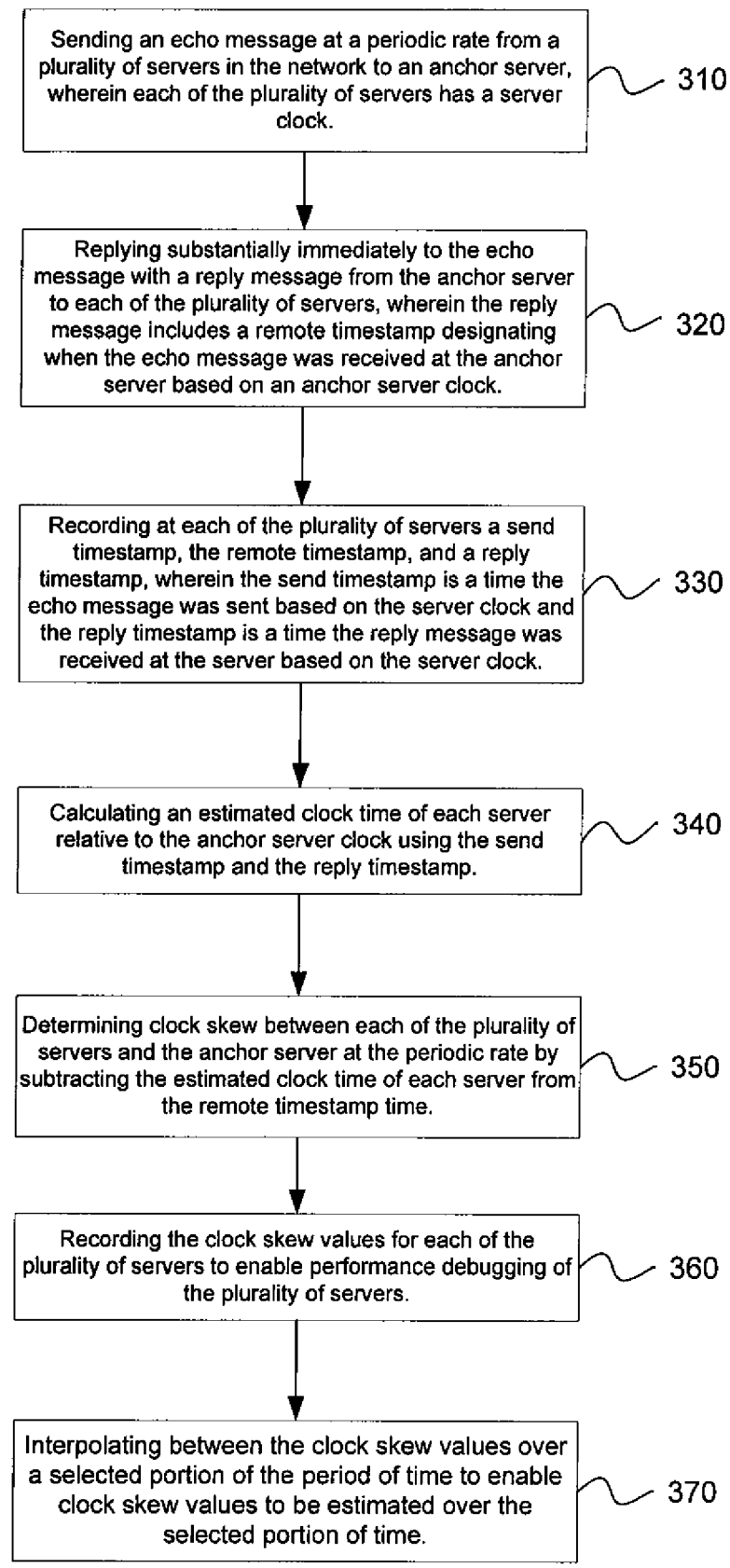
FIG. 3 is a flow chart depicting a method for measuring clock skew over a period of time on a network in accordance with an embodiment of the present disclosure.

In accordance with one specific embodiment of the present disclosure, a method for measuring clock skew over a period of time on a network is disclosed, as depicted in the flow chart of FIG. 3, though each of these steps is not strictly considered to be necessary. In this embodiment, the method includes the operation of sending 310 an echo message at a selected rate from a plurality of servers in the network to an anchor server. The selected rate may be periodic or non-periodic. For example, the echo message may be sent based on the reception of a non-periodic signal, such as a signal from a user. Each of the plurality of servers can be coupled to a separate clock. The separate clock is typically a clock that is internal to the server. However, it is also possible that a group of servers may be connected to a single clock. For example, all of the servers in a particular location may be connected to a single clock. One or more servers in each group can send an echo message at the periodic rate to the anchor server. The anchor server can be connected to the plurality of servers via a local area network, a wide area network, over an internet connection, or another type of networked connection, as can be appreciated.

The method further includes the operation of replying 320 substantially immediately to the echo message with a reply message from the anchor server to each of the plurality of servers. The server's hardware and software can be configured to enable the reply message to be sent substantially immediately. A typical server can receive the echo message and send a reply message within a relatively short period of time. The actual time is dependent on the type of hardware used, but can range from several nanoseconds to several microseconds. The reply message includes a remote timestamp designating when the echo message was received at the anchor server based on an anchor server clock.

An additional operation involves recording 330 a send timestamp, the remote timestamp, and a reply timestamp at each of the plurality of servers. Each server in the plurality of servers has a specific send timestamp based on the server's clock that designates the time the echo message was sent from the particular server to the anchor server. The reply timestamp is the time the reply message from the anchor server was received at the particular server based on the server's clock.

Knowledge of the send timestamp, the remote timestamp, and the reply timestamp enables values to be deduced for each server that are all related to the single, specific time frame provided by the anchor server. The method further includes calculating 340 an estimated clock time of each server relative to the anchor server clock using the send timestamp and the reply timestamp. For example, in one embodiment the estimated clock time of each server clock can be estimated at the time of the remote timestamp was generated on the anchor server by adding the send timestamp with the reply timestamp and dividing by two.

The method further provides determining 350 clock skew between each of the plurality of servers and the anchor server at the periodic rate. In one embodiment, the clock skew can be determined by subtracting the estimated clock time of each server from the remote timestamp time. The clock skew value can be unique to each server based on the difference in clock values of the server and the anchor server at a particular time. A particular server's skew value at the particular time is referred to as skew (local) data. The clock skew values for each of the plurality of servers can be recorded to enable performance debugging of the plurality of servers, as depicted in block 360. Interpolation can then be performed between the clock skew values over a selected portion of the period of time to enable clock skew values to be estimated over the selected portion of time, as illustrated in block 370.

Figure 4:
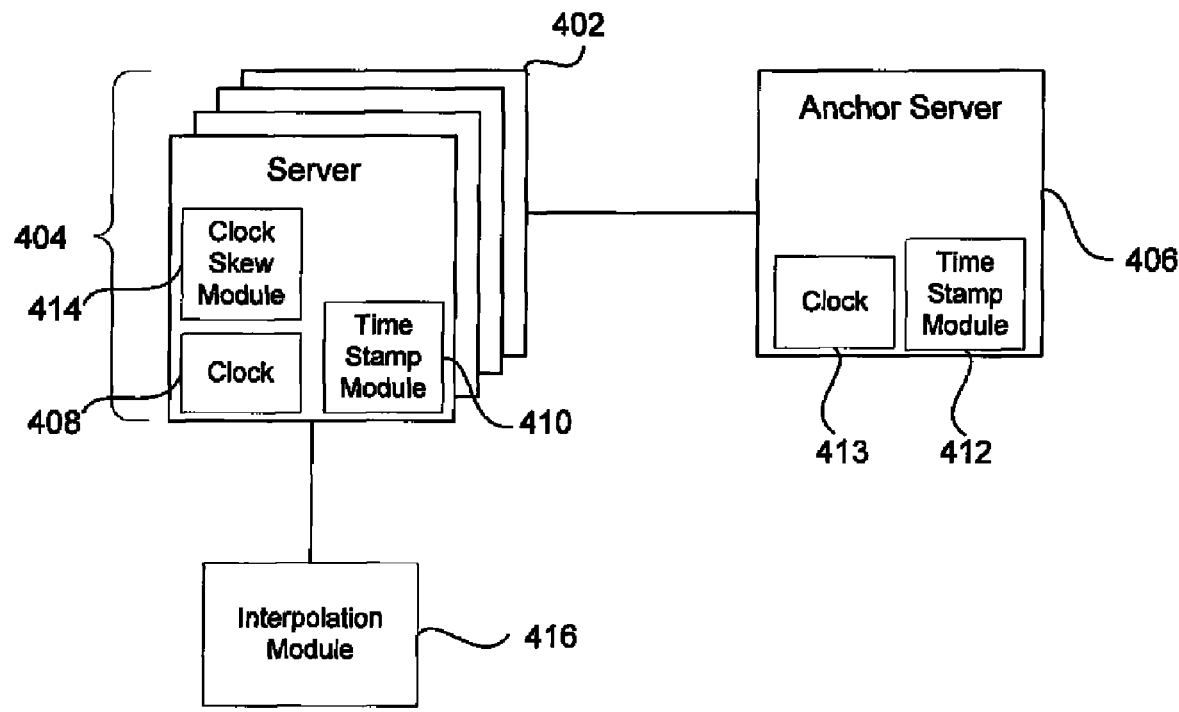
FIG. 4 is a block diagram illustrating a system for measuring clock skew over a period of time on a network in accordance with an embodiment of the present disclosure.

In another embodiment of the present disclosure, a system for measuring clock skew over a period of time on a network is disclosed. A block diagram of one exemplary embodiment of the system is illustrated in FIG. 4. The system comprises a plurality of servers 402 in a server cluster 404 connected to a remote anchor server 406, with each server 402 having a server clock 408. A server timestamp module 410 is operable in each of the plurality of servers. The server timestamp module is configured to transmit an echo message at a periodic rate from each server 402 to the remote anchor server 406.

An anchor server timestamp module 412 is configured to send a reply message to each server substantially immediately upon reception of the echo message. The reply message includes a remote timestamp designating when the echo message was received at the anchor server 406 based on an anchor server clock 413. The server timestamp module 410 is further configured to receive the reply message from the anchor server 406 and record a send timestamp, the remote timestamp, and a reply timestamp. The send timestamp includes a time the echo message was sent from the server 402 based on the server clock 408. The reply timestamp includes a time the reply message was received at the server 402 based on the server clock 408.

A clock skew module 414 can be operable on each server. The clock skew module is configured to calculate an estimated clock time of each server clock 408 at the time the remote timestamp was generated on the anchor server clock 413. In one embodiment, the estimated clock time can be calculated by adding the send timestamp with the reply timestamp and dividing by two. The clock skew module 414 is further configured to determine a clock skew value between each of the plurality of servers 402 and the anchor server 406 at the periodic rate by subtracting the estimated clock time of each server 402 from the remote timestamp. The clock skew value that is measured at the periodic rate for each of the servers can be recorded.

The system can include an interpolation module 416. The interpolation module can be used to interpolate between the clock skew values over a selected portion of the period of time to enable a skew (t) value to be estimated over the selected portion of time.

The periodic rate at which the clock skew value is recorded can be selected based on the needs of the distributed system. In some systems, a large number of measurements over a selected period are needed to provide sufficient resolution to give an accurate record of changes in the skew. In other types of systems, a lower number of measurements may be needed. For example, in one embodiment, a skew value can be recorded for each network node (i.e. computing device) in the network at a frequency of once every 250 milliseconds.

To reduce the amount of overhead required to monitor and record the clock skew between the nodes in the network, while maximizing the ability to use the data in performance debugging of the network, a curve can be fit to the data obtained from the skew measurements. However, as can be seen from FIG. 1, temporal measurements based on the clocks in the network may not be accurate every time. In some cases, the anchor clock or server clock may drift backwards, resulting in negative time values. In other cases, the anchor time server may not respond immediately. This leads to recorded values that are significantly off of the expected values.

Clearly, if the values of a particular server's local clock time are plotted relative to the skew (local) time, (local, skew (local)), as shown in FIG. 1, it results in a collection of points that forms an irregular curve. A function can be found which closely interpolates the points in this figure. This function can then be used to compute a skew value, skew (t), for an arbitrary time (t), rather than being limited by the number of measurement points.

There are many ways to interpolate a collection of points. However, several types of interpolation are less advantageous for this type of data. For example, Lagrangian interpolation, which attempts to go through all measurement points using a polynomial, may not work well since the resulting polynomial equation may be too high a degree. Additionally, some measurement points are bad measurements, and therefore should be neglected rather than used in the interpolation. Also, Lagrangian interpolation may result in over-fitting, where the polynomial curve is quite bizarre between measurement points. This would result in a curve that may contain inaccurate data between the measured points.

The use of piecewise interpolation can be used to provide a curve having a better fit to the data points related to the skew (local) time. There are several different types of piecewise interpolation. For example, at least one of piecewise linear, piecewise cubic, and piecewise quadratic interpolation may be used. Piecewise linear interpolation generally involves less computing power. However, the other types of interpolation can also provide curves with good fits.

Figure 5:
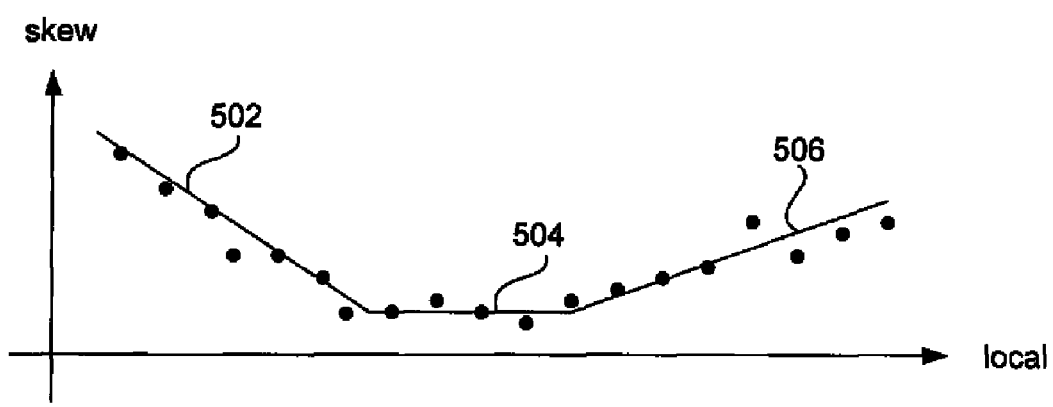
FIG. 5 is an illustration of a curve that interpolates between multiple measurement points using piecewise linear interpolation.

In piecewise interpolation, the data points are divided into windows. For example, FIG. 5 provides an exemplary illustration of a curve that interpolates between multiple measurement points using piecewise linear interpolation. It can be seen that three separate windows 502, 504 and 506 were used in the interpolation. The windows have a substantially equal, fixed size along the local (x) axis.

When using piecewise linear interpolation with the skew (local) data, the use of fixed windows was found to work in some instances. However, when a window contained mostly bad measurements it resulted in an overall interpolation that was less than optimal. To overcome this limitation, the use of variable size windows with weighted least squares interpolation can be used to fit a curve to the skew (local) data and provide substantially accurate approximations between each of the data points.

In one embodiment of the present disclosure, a multi-step process can be used to fit a curve to the skew (local) data using a piecewise linear interpolation with variable window size and weighted least squares weighting. A first step involves selecting a near-minimal round trip time (RTT). As previously discussed, the RTT for each echo message sent from a selected computing device in the network to the anchor server takes a set amount of time. The round trip time can be calculated as the reply time minus the send time for each echo message. While the use of a minimum round trip time can be optimal, the timing errors in the clock data due to clock drift, response delay, network congestion, and so forth can result in negative round trip time values. In order to substantially eliminate the erroneous values, a near minimal round trip time value is selected by selecting a round trip time measurement value with a time that is in the first percentile of the echo message timing data. In one embodiment, the round trip time value that is in the first percentile can then be scaled with a multiplier value, such as 1.1 to provide a selected RTT value.

Figure 6:
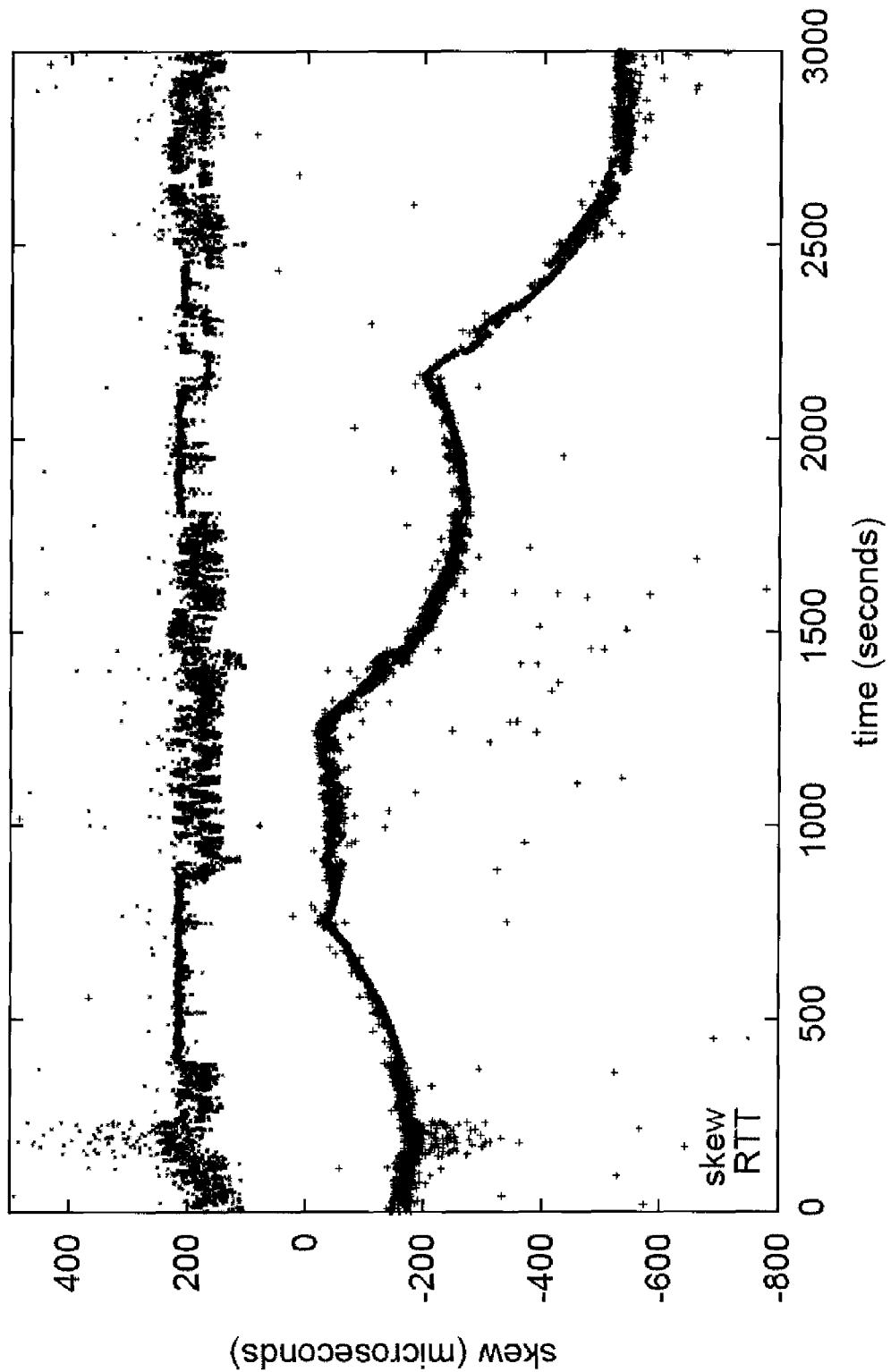
FIG. 6 is an illustration of clock skew data and round trip time (RTT) data between host E and the anchor server in accordance with an embodiment of the present disclosure.

For example, FIG. 6 shows a plurality of data points representing the round trip time of an echo signal between a selected computing device (host E from FIG. 1) and an anchor server. The data points for the RTT are represented using the symbol "x". The data points were recorded for a period of approximately 3000 seconds. RTT data in the first percentile on the graph has a value of approximately 100 microseconds. This value can then be scaled with a multiplier value of 1.1 to obtain a minimum RTT value in this example of 110 microseconds.

Figure 7:
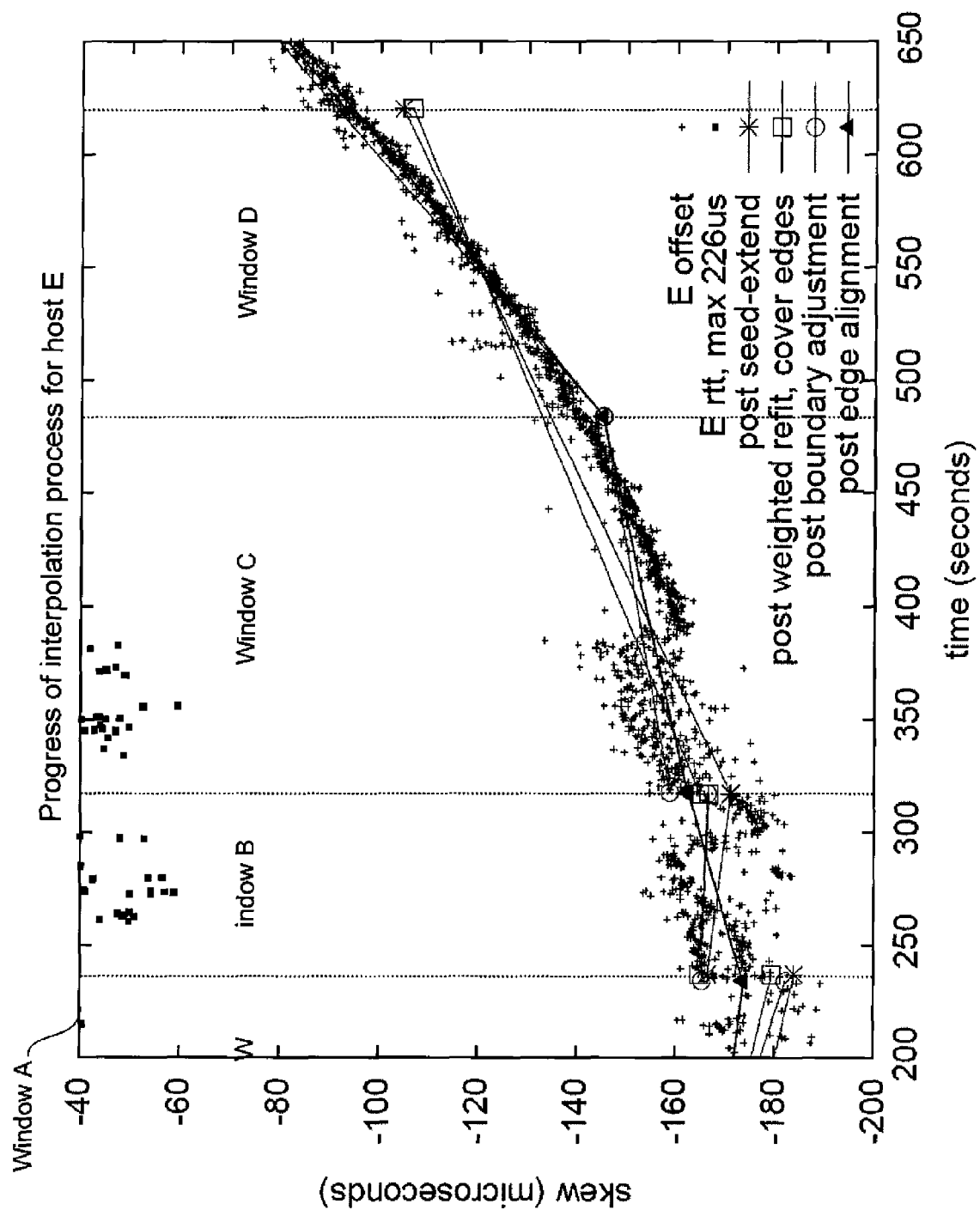
FIG. 7 is an illustration of progress made in the interpolation process for host E in accordance with an embodiment of the present disclosure.

FIG. 7 shows a graph plotting clock skew data over a period of 450 seconds (from 200 seconds to 600 seconds) for a pathway between a selected computing device (host E from FIG. 1) and an anchor server. FIG. 7 provides an illustration of the progress made in the interpolation process.

The piecewise linear interpolation of the clock skew data values can include an extend interpolation step. In one embodiment, there may not be windows in the first iteration of the piecewise linear interpolation. Therefore, this step may not be performed in the first iteration.

In this step, the current window(s) are iteratively extended in either direction as long as the window has a good fit. A good fit is defined by bounds on the amount of error at the minimum, maximum, $10^{th}$, $25^{th}$, $75^{th}$, and $90^{th}$ percentiles. The bounds are symmetric and relative to the selected minimum RTT value. In one embodiment, the error bounds for the minimum and maximum clock skew values within the window are set to $1/10^{th}$ of the RTT value; the error bounds for the $10^{th}$ and $90^{th}$ percentiles of the clock skew values within the window are set to $1/15^{th}$ of the RTT value; and the error bounds for the $25^{th}$ and $75^{th}$ percentile are set to $1/20^{th}$ of the RTT value.

For example, for the selected minimum RTT value of 110 microseconds, the amount of error for the minimum and maximum values of the skew (t) values within the window will need to be less than $1/10^{th}$ of the RTT value, or approximately 11 microseconds. The amount of error for the $10^{th}$ and $90^{th}$ percentiles of the clock skew values within the window must be within 7.3 microseconds of the RTT values, and so forth. It can be appreciated that other statistical measures for bounding the error can be selected based on computing power and the level of interpolation desired. For example, standard deviation can also be used as a bound for the error.

The next step is to select new windows. For a collection of uncovered points, a random point is selected and a new window is attempted to be placed around this point. After selecting a point, a seed window operation is performed on the window. The seed window operation involves trying to find a good window that is centered around a specific point, p. The specific point may be the random point that was selected to be within the window. The window is iteratively extended in each direction based on a number of criteria, including: (1) the boundaries should not be too far from the seed; 2) there should be no long gaps of time with no measurement values in the window; and 3) after calculating a least squares interpolation of the points, the fit should be good based on the criteria listed in the extend interpolation step.

Regarding the first criteria, a typical first iteration may place the window boundaries at a distance of +/−45 seconds from the clock skew data value selected as the seed value p. A value of 10 seconds may be selected as a limit on gaps with no measurement values in the window. Other initial values can be selected based on results from previous measurements. For example, if the +/−45 second initial window boundaries from the specific point p results in a window that does not have a good fit, a high percentage of the time, then a smaller initial window size may be selected. Alternatively, if the initial window size almost always results in a good fit, then a larger initial window size may be selected. Similarly, the selected 10 second value for gaps may be adjusted based on results.

An additional limitation can be that there is a sufficient number of clock skew data points within the window. For example, their may be a limitation that there are at least 20 points within the window. If there is a clock skew data measurement made at a rate of 1 every 250 milliseconds, then there are typically hundreds of points within an initial window size of +/−45 seconds.

If the selected criteria of the clock skew data points within the window are within the chosen bounds, then the size of the window is extended. For example, it may be extended by +/−5 seconds. Otherwise, the seed point is ignored since a window that includes the seed point cannot be found using the selected criteria.

The determination of whether the clock skew data within the window has a good fit is based on the selected minimum RTT value. With the RTT selected to be in the first percentile, there are a limited number of points that will qualify under the selected criteria. In order to select more data points, the RTT value can be relaxed. For example, in one embodiment, the RTT value may be relaxed by a value of RTT/4, or by about 27.5 seconds. After attempting to cover each point over the time span within a window, the RTT value can be relaxed. After four times, the RTT value is approximately twice the original selected minimum value, or about 220 microseconds in the example.

Once an attempt has been made to include each clock skew data point has within a window, using the steps above, a final fix-up can be accomplished on the data within the windows. A first step of the final fix-up is a weighted refit step. The goal of a weighted least squares interpolation is to say that some data point values are good and have a good weight (i.e. a high value) and some are bad and therefore have a relatively low weight. The weight on each point in a piecewise linear interpolation is typically selected based on the variance for each measurement. However, in this embodiment, there are no variance values for each measurement. Therefore, each data point is weighted based on its distance from the selected minimum RTT value.

In one embodiment of the present disclosure, the value of each clock skew data measurement is weighted using the equation:

$$\text{weighted refit} = 2^{-5\frac{s-r}{R-r}}$$

where r is the selected minimum clock skew data value in a window, R is the maximum clock skew data value in a window, s is the measured clock skew data value in the window, and −5 is the selected scaling factor. If the measured value s is equal to the maximum value R, then the weighted value is $2^{-5}$, or 1/32. If the measured value s is equal to the minimum value r, then the weighted value is $2^0$, or 1. The formula is selected to exponentially under-value measurements as they move from the minimum to the maximum RTT. A scaling factor of −10 was originally used in an experimental setup. However, it was determined that the value provided too fast of a decay. Other values than (−5) can be used to provide a desired decay rate in the weighting refit factor.

A second step in the final fix-up is to cover the steps that occur in gaps before the first window, after the last window, or between the windows. When there are gaps that occur between windows, the boundary between the windows can be moved. In one embodiment, the boundaries are moved first to the right, and then to the left. Whichever window better predicts the clock skew values outside the window is selected to include the points within the window's boundaries. This is done for all windows within the selected time period.

A third step in the final fix-up is an adjust boundaries step. Once all of the gaps are covered then the selected time period consists of a plurality of windows that are adjacent. The window boundaries can then be iteratively moved to determine if the sum of the error for the points in the window (i.e. the difference between each point and the minimum RTT value) is better or worse when the boundary is moved. For example, a boundary may be moved for a selected number of clock skew data points in one or both directions and checked at each data point to determine if the overall error increased or decreased. In one embodiment, the boundary can be moved 5 data points in each direction and the sum of the error be re-measured at each point to determine if the error has increased or decreased. The boundary may first be moved to the left, and then to the right to provide adjacent windows with a minimum amount of overall error over the selected time period. This can be accomplished for each window.

For example, FIG. 7 illustrates an example plot of the final fix-up steps for piecewise linear interpolation with variable window size and weighted least squares weighting of the clock skew data points for a subset of the total time on host E shown in FIG. 1. The plot shows that the variable window sizes were selected, with a first window, referred to as Window A from the left side of the plot to approximately 240 seconds. Window B is located from 240 seconds to 320 seconds. Window C is located from 320 seconds to 625 seconds. And Window D is located from 625 seconds to the right side of the plot. However, after the post boundary adjustment step, the left boundary of Window D (the right boundary of Window C) was adjusted from 625 seconds to a location at approximately 475 seconds. During the process, the window boundary was iteratively moved 5 points to the left and the amount of error in Window C and Window D was tested. The total amount of error in the windows was decreased. Therefore, the boundary was again moved 5 points to the left. This continued until the boundary was moved from 625 seconds to 475 seconds. At that point, further moves to the left or the right resulted in a greater amount of overall error. Therefore, this final boundary position was selected between Windows C and D. Larger or smaller boundary moves may be selected. The iteration size can be selected based on the accuracy desired and the amount of computing time needed to obtain an interpolation of the clock skew data measurements for a selected time period. This step can be used to compensate when the extend-interpolation step moves the window boundaries too far in one direction or another.

Occasionally, if a window boundary is moved left and the error in the windows is recalculated, and then the window is then moved right and the error is recalculated, and both errors appear to be lower than the previous error, then the adjust boundary step may get caught in a loop and cause a boundary oscillation. Boundary oscillation can occur due to rounding errors in the error calculation of all of the points within the window. A maximum number of iterations may be selected, such as 1000 iterations, after which the adjust boundary step is stopped.

A last step in the final fix-up is the force edge alignments step. In one embodiment, this step forces edges of the window segments to be within 0.25 microseconds. For example, at the boundary between Windows A and B at a time period of approximately 240 seconds, the difference in plots between the circle and triangle shows the forced edge alignment that was performed in the exemplary plot. The alignment may be forced by inserting an artificial point half way between the segments in the two windows. After the artificial point is inserted then the weighted least squares is again calculated and the error determined for each window. If the error is not acceptable, then the weight of the artificial point can be increased. For example, the weight of the artificial point can be multiplied by a value of 1.1. This can continue until the value at the boundary is within a desired tolerance, such as 0.25 microseconds.

Figure 8:
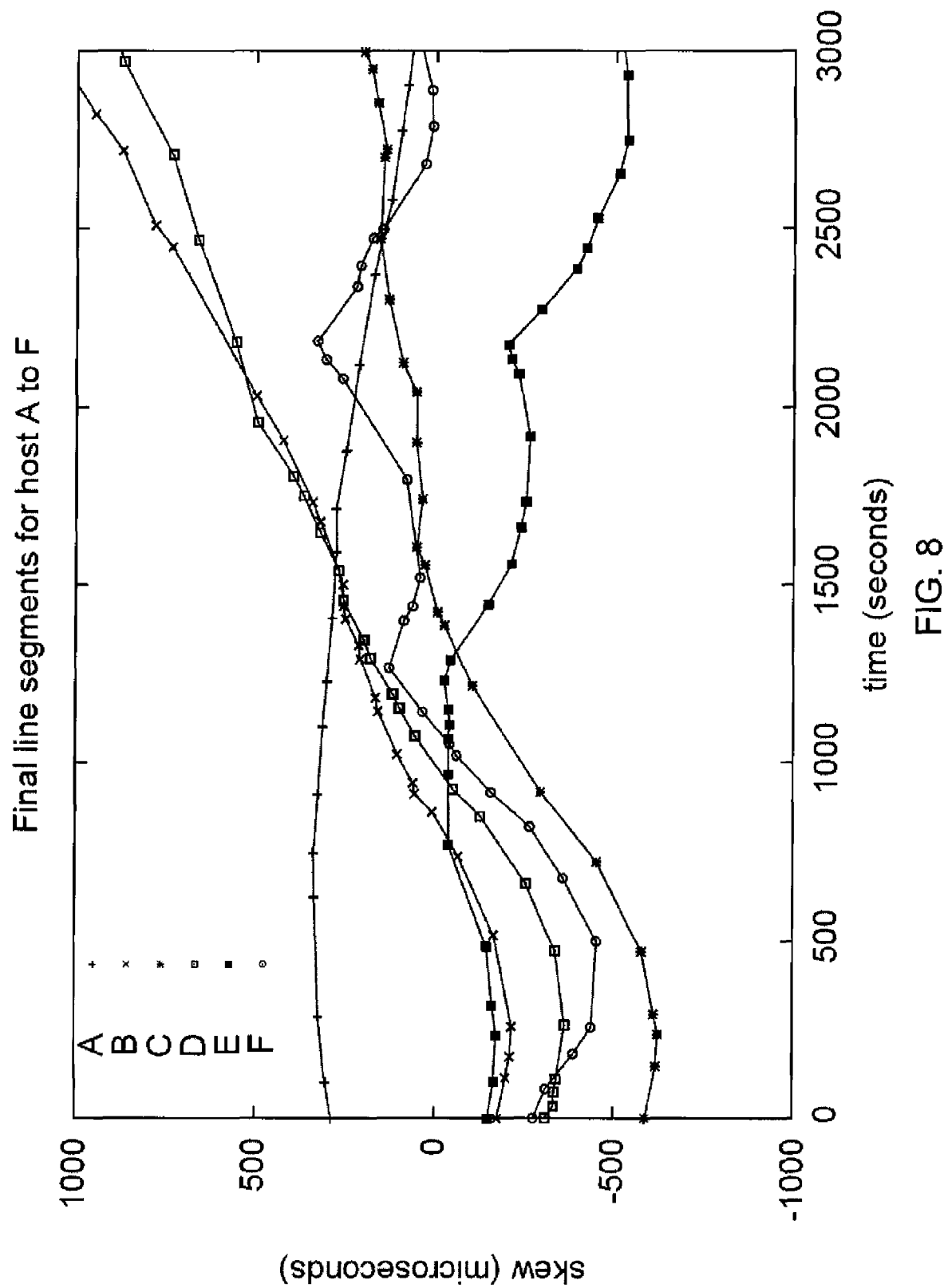
FIG. 8 is an illustration of interpolated lines for hosts A-F using the interpolation process in accordance with an embodiment of the present disclosure.

FIG. 8 shows the final results for the piecewise linear interpolation processes for the clock skew value measurements from hosts A-F of FIG. 1 using the process described above. The use of variable size windows and weighted least squares weighting of the clock skew data points provides a substantially accurate curve fit to the data for each host. The ability to accurately fit a curve to the data, while substantially eliminating erroneous data points, provides the ability to precisely estimate the amount of clock skew value, skew (t), between any of the hosts (A-F) in the network at any time. This allows inter-node timing to be accurately determined, and thereby enables performance debugging of software programs designed to operate on the network.

Performance debugging enables complex software to run quickly and efficiently on a network. The increase in efficiency reduces the overall amount of computing power, and, in so doing, reduces the costs of the network. Alternatively, instead of scaling down the system, performance debugging can enable software to operate at a faster rate on the network and provide quicker results.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method for measuring network clock skew, comprising:
    sending an echo message at a periodic rate from a plurality of servers to an anchor server;
    sending a reply message having a remote timestamp based on an anchor server clock from the anchor server to each of the plurality of servers;
    recording the remote timestamp at each of the servers;
    recording a send timestamp and a receive timestamp at each of the servers, wherein the send timestamp is a time the echo message was sent based on the server clock and the reply timestamp is a time the reply message was received at the server based on the server clock;
    calculating an estimated clock time of each server relative to the anchor server from the send and receive timestamps;
    determining a clock skew value by subtracting the estimated clock time of each server from the remote timestamp time; and
    performing piecewise interpolation with variable sized windows and weighted least squares interpolation between the clock skew values over a selected portion of the period of time to enable clock skew values to be estimated over the selected portion of time.

2. A method as in claim 1, further comprising interpolating between the clock skew values determined at the periodic rate to enable a skew (t) value to be estimated over a selected portion of time.

3. A method as in claim 1, wherein the piecewise interpolation is piecewise linear interpolation.

4. A method for measuring clock skew over a period of time on a network, comprising:
    sending an echo message at a selected rate from a plurality of servers in the network to an anchor server, wherein each of the plurality of servers are connected to a clock source;
    replying substantially immediately to the echo message with a reply message from the anchor server to each of the plurality of servers, wherein the reply message includes a remote timestamp designating when the echo message was received at the anchor server based on an anchor server clock;
    recording at each of the plurality of servers a send timestamp, the remote timestamp, and a reply timestamp, wherein the send timestamp is a time the echo message was sent based on the server clock and the reply timestamp is a time the reply message was received at the server based on the server clock;
    calculating an estimated clock time of each server relative to the anchor server clock using the send timestamp and the reply timestamp;
    determining clock skew values between each of the plurality of servers and the anchor server at the selected rate by subtracting the estimated clock time of each server from the remote timestamp time;
    recording the clock skew values for each of the plurality of servers to enable performance debugging of the plurality of servers; and
    performing piecewise interpolation with variable sized windows and weighted least squares interpolation between the clock skew values over a selected portion of the period of time to enable clock skew values to be estimated over the selected portion of time.

5. A method as in claim 4, wherein calculating the estimated clock time further comprises calculating the estimated clock time of each server at the time the remote timestamp was generated on the anchor server by adding the send timestamp with the reply timestamp and dividing by two.

6. A method as in claim 4 wherein performing piecewise interpolation further comprises performing at least one of piecewise linear interpolation, piecewise cubic interpolation, and piecewise quadratic interpolation.

7. A method as in claim 4, wherein interpolating between the clock skew values further comprises selecting a minimum round trip time (RTT) value.

8. A method as in claim 7, wherein interpolating between the clock skew values further comprises
    selecting a recorded clock skew value within the selected portion of time;
    forming a window having a selected initial time period centered about the recorded clock skew value; and
    iteratively extending the window in both temporal directions to include recorded clock skew values, wherein the window is extended so long as the recorded clock skew values within the window provide a good fit, wherein the good fit is determined based on an RTT associated with selected recorded clock skew values relative to the minimum RTT value.

9. A method as in claim 8, further comprises increasing the minimum RTT by a selected amount to find additional windows based on the increased minimum RTT.

10. A method as in claim 8, further comprising performing a weighted least squares interpolation on the recorded skew values within each window, wherein each skew value is weighted based on its distance from the minimum RTT value.

11. A method as in claim 10, further comprising performing a weighted least squares interpolation on the recorded skew values within each window using the equation:

$$\text{weight} = 2^{-5\frac{s-r}{R-r}}$$

where r is the minimum clock skew value in the window, R is the maximum clock skew value in the window, and s is the measured clock skew value in the window.

12. A method as in claim 8, further comprising covering gaps that occur between windows by moving a window boundary forward in time and backwards in time to determine which direction better predicts the recorded skew values located in the gaps outside the window and including the recorded skew values in the window that best predicts the recorded skew values.

13. A method as in claim 12, further comprising adjusting window boundaries between adjacent windows forwards in time and backwards in time and selecting a window boundary location where a sum of errors of the adjacent windows is substantially minimal.

14. A method as in claim 12, further comprising forcing edge alignments between adjacent windows to enable window segments to be within a selected time tolerance, comprising:
    inserting an artificial point half way between window segments in the adjacent windows
    calculating weighted least squares for the recorded skew values in each window;
    determining if an error for the window related to the weighted least squares is within a predetermined level; and
    multiplying a value of the artificial point by a selected amount and calculating the weighted least squares until the error is within the predetermined level.

15. A method as in claim 4, further comprising sending an echo message at a periodic rate from a network server to an anchor server, wherein the network server is connected to a plurality of servers that are each connected to a single clock source.

16. A method as in claim 4, further comprising sending the echo message at the periodic rate from the plurality of network servers to the anchor server, wherein each of the plurality of network servers has a separate clock source.

17. A system for measuring clock skew over a period of time on a network, comprising:
    a plurality of servers in a server cluster connected to a remote anchor server, with each server having a server clock;
    a server timestamp module operable in each of the plurality of servers, wherein the server timestamp module is configured to transmit an echo message at a selected rate from each server to the remote anchor server;
    an anchor server timestamp module configured to send a reply message to a server substantially immediately upon reception of the echo message, wherein the reply message includes a remote timestamp designating when the echo message was received at the anchor server based on an anchor server clock;
    the server timestamp module further configured to receive the reply message from the anchor server and record a send timestamp, the remote timestamp, and a reply timestamp, wherein the send timestamp designates a time the echo message was sent based on the server clock and the reply timestamp designates a time the reply message was received at the server based on the server clock;
    a clock skew module configured to calculate an estimated clock time of each server relative to the anchor server clock by adding the send timestamp with the reply timestamp and dividing by two;
    the clock skew module further configured to determine a clock skew value between each of the plurality of servers and the anchor server at the periodic rate by subtracting the estimated clock time of each server from the remote timestamp time; and
    an interpolation module configured to perform piecewise interpolation with variable sized windows and weighted least squares interpolation between the clock skew values over a selected portion of the period of time to enable a skew (t) value to be estimated over the selected portion of time.

18. A system as in claim 17, wherein the interpolation module is configured to perform at least one of piecewise linear interpolation, piecewise cubic interpolation, and piecewise quadratic interpolation.

* * * * *

UNITED STATES PATENT AND TRADEMARK OFFICE
CERTIFICATE OF CORRECTION

| | | |
|---|---|---|
| PATENT NO. | : 8,108,557 B2 | Page 1 of 1 |
| APPLICATION NO. | : 12/357636 | |
| DATED | : January 31, 2012 | |
| INVENTOR(S) | : Eric A. Anderson | |

It is certified that error appears in the above-identified patent and that said Letters Patent is hereby corrected as shown below:

In column 10, line 51, in Claim 6, delete "claim 4" and insert -- claim 4, --, therefor.

In column 10, line 59, in Claim 8, delete "comprises" and insert -- comprises: --, therefor.

In column 11, line 40, in Claim 14, delete "windows" and insert -- windows; --, therefor.

Signed and Sealed this
Fourth Day of December, 2012

David J. Kappos
*Director of the United States Patent and Trademark Office*